United States Patent
Scipioni et al.

(10) Patent No.: US 7,991,693 B2
(45) Date of Patent: Aug. 2, 2011

(54) SYSTEM AND METHOD FOR DISTRIBUTION OF PAYMENT MEDIA

(75) Inventors: German Scipioni, San Jose, CA (US); Apur Shah, Richmond (GB)

(73) Assignee: eBay Inc., San Jose, CA (US)

( * ) Notice: Subject to any disclaimer, the term of this patent is extended or adjusted under 35 U.S.C. 154(b) by 54 days.

(21) Appl. No.: 12/115,259

(22) Filed: May 5, 2008

(65) Prior Publication Data

US 2009/0276356 A1 Nov. 5, 2009

(51) Int. Cl.
*G06Q 40/00* (2006.01)
(52) U.S. Cl. .............. 705/41; 705/1; 705/39; 705/17; 705/42; 705/44
(58) Field of Classification Search .......... 705/1, 41, 705/44, 17, 16, 39, 26, 67, 40, 79, 80; 235/382, 235/381, 380; 455/506
See application file for complete search history.

(56) References Cited

U.S. PATENT DOCUMENTS

| | | | |
|---|---|---|---|
| 2006/0080232 A1* | 4/2006 | Epps | 705/39 |
| 2007/0150414 A1* | 6/2007 | Templeton | 705/40 |
| 2008/0052233 A1* | 2/2008 | Fisher et al. | 705/40 |

OTHER PUBLICATIONS

Economic and Labour Relations Review, v 17 Looking beyond the west? The Korea employers's federation and the Challenges of membership adhesion and cohesion. Sep. 2006, Journal.*

* cited by examiner

*Primary Examiner* — Mary Cheung
*Assistant Examiner* — John H Holly
(74) *Attorney, Agent, or Firm* — Haynes & Boone, LLP.

(57) ABSTRACT

Systems and methods of the present disclosure provide a method for distributing payment media to a customer. In various embodiments, the systems and methods include receiving a request from a user via a network, generating a virtual payment number related to the user, associating the virtual payment number to an RFID chip embedded in a sticker, and distributing the sticker to the user via, for example, the mail.

22 Claims, 7 Drawing Sheets

SYSTEM AND METHOD FOR DISTRIBUTION OF PAYMENT MEDIA

BACKGROUND

1. Field of the Invention

The present invention generally relates to financial transactions and more particularly to the distribution of payment media.

2. Related Art

During the course of financial transactions, customers provide payment in exchange for items from a merchant. Payment options typically include checks, debit cards, credit cards and electronic fund transfers.

Some companies have offered RFID as a means to present identification and payment for financial transactions. Radio Frequency Identification (i.e., RFID) is an identification technology that uses integrated circuit (i.e., IC) chips to transmit identifying information to an RFID reader. However, conventional RFID systems require the use of a hard shell case that attaches to a key chain, for example. This type of system is relatively not secure because the hard shell case may break and be lost or stolen. Further, the ordering, generation and distribution of this type of system is inefficient and can take a long time.

Thus, there currently exists a need to improve RFID systems and the distribution of RFID systems for financial transactions.

SUMMARY

In accordance with one or more embodiments of the present disclosure, systems and methods for distributing payment media to a user, customer or client include receiving a request from a user via a network, generating a virtual payment number related to the user, associating the virtual payment number to an RFID chip embedded in a sticker, and distributing the sticker to the user.

In various implementations, the systems and method include establishing a user account with the user for depositing funds and associating the virtual payment number to the user account. The user account may be funded from a banking account and/or a credit account, wherein the virtual payment number may be associated with funds from the banking account and/or credit account. The RFID chip is adapted to store and transmit information related to the user. The sticker may be distributed to the user via mail. The sticker may be adapted for affixing to a physical media including a plastic card or a cell phone. The sticker may be used to facilitate financial transactions between the user and at least one merchant.

In accordance with one or more embodiments of the present disclosure, systems and methods system for distributing payment media to a customer include a first component adapted to communicate with the customer via a network and a second component adapted to receive a request for at least one payment media from the customer via the network, generate the at least one payment media based on customer information passed with the request, and distribute the generated payment media to the customer. In one implementation, the payment media is an RFID chip embedded in a sticker.

These and other features and advantages of the present disclosure will be more readily apparent from the detailed description of the embodiments set forth below taken in conjunction with the accompanying drawings.

Figure 1A:
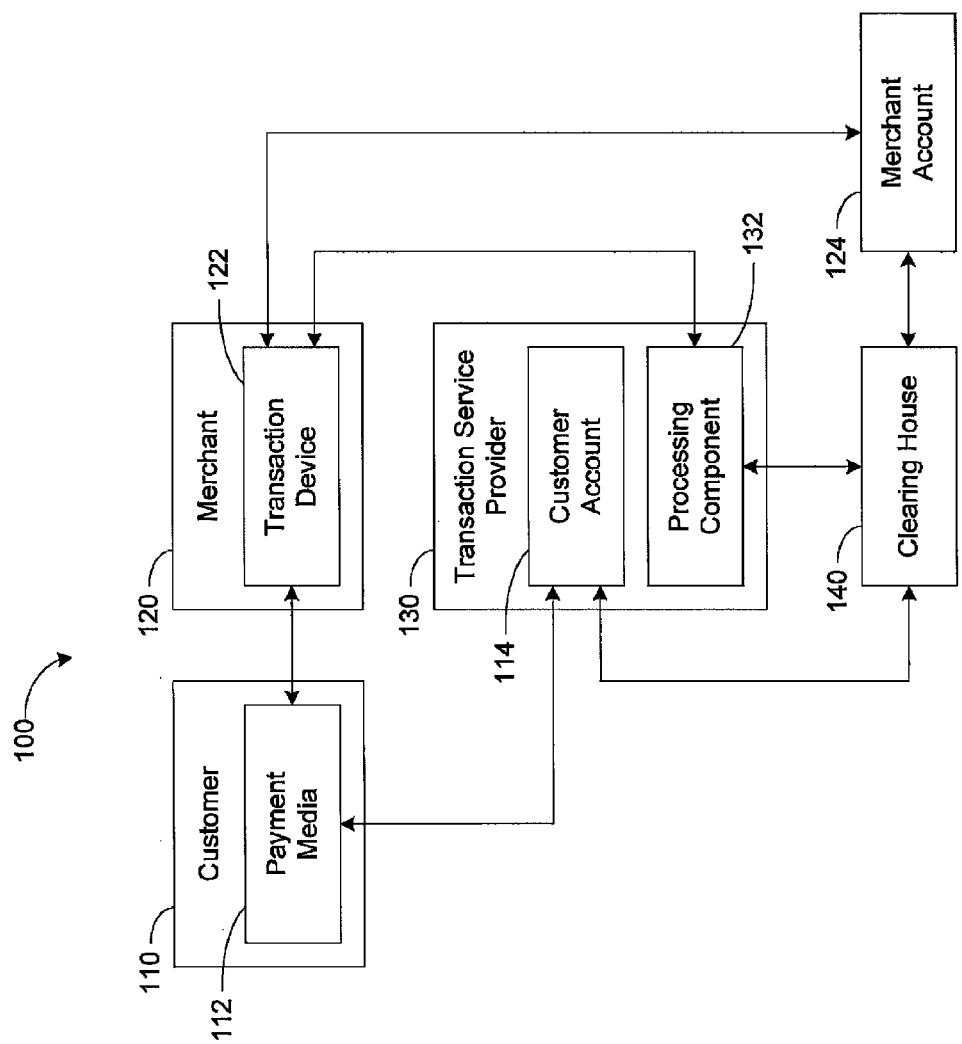
FIGS. 1A-1C show block diagrams of various systems for facilitating financial transactions in accordance with embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure relate to the generation and distribution of one or more RFID chips embedded on stickers to facilitate financial transactions and processing payments for the financial transactions. In various implementations, the RFID sticker may be used at a point of sale (POS) and run through existing electronic financial networks, such as MasterCard or the Internet, to resolve requested financial transactions between a customer and a merchant. In various implementations, payment parameters for the RFID chips may be set and/or changed pre-activation or post activation.

FIG. 1A shows one embodiment of a system 100 for facilitating and processing financial transactions. As shown in FIG. 1A, the system 100 includes a customer 110 that provides a form of monetary payment in exchange for a product and/or service, a merchant 120 that provides the product and/or service in exchange for monetary payment from the customer 110, and a transaction service provider 130 that processes the transaction between the customer 110 and the merchant 120. It should be appreciated that the merchant 120 may comprise a plurality of merchants with each having a transaction device.

In one embodiment, the customer 110 establishes a customer account 114 with the transaction service provider 130, wherein the customer 110 may deposit monetary funds in the customer account 114. The transaction service provider 130 issues the customer 110 some form of payment media 112, such as an RFID sticker, that is linked to the customer account 114. The customer 110 may use the payment media 112 to purchase items (e.g., goods, products and/or services) from the merchant 120. As described in greater detail herein, the customer 110 may request one or more particular payment parameters for the payment media 112, such as number of uses, spending limits, authorized users, and authorized merchants. Moreover, the customer 110 may also change these payments parameters at any time before and after activation of the payment media 112.

In one implementation, the customer 110 uses the payment media 112 to purchase items from the merchant 120. The merchant 120 uses a transaction device 122, such as point-of-sale (POS) device, to request processing of the transaction between the customer 110 and the merchant 120 from the transaction service provider 130. In one example, a processing component 132 of the transaction service provider 130 communicates with a clearing house 140 to debit the customer account 114, according to an amount specific to the payment, and credit therewith a merchant account 124 linked to the merchant 120.

In one embodiment, the clearing house 140 resolves financial transactions through validation, delivery and settlement. As such, the clearing house 140 may comprise an agency or institution having a system for settling indebtedness between members of that system through which accounts may be debited and/or credited of monetary funds.

Figure 1B:
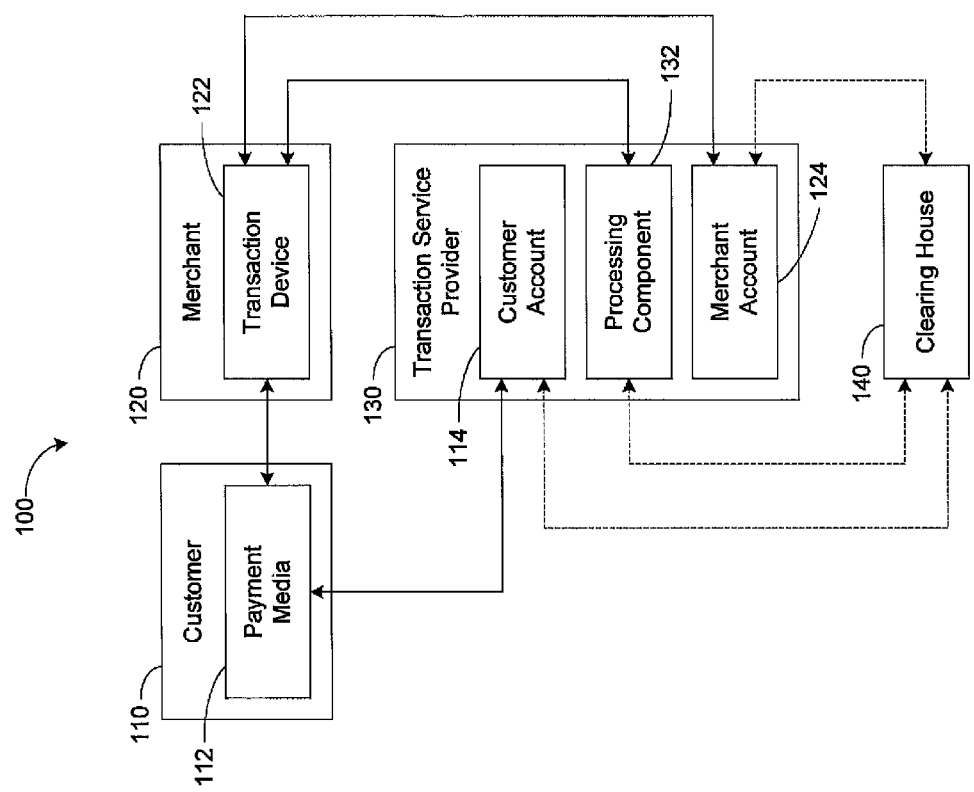

In one embodiment, the merchant 120 may establish the merchant account 124 with any type of financial institution, such as a bank. However, in another embodiment, as shown in FIG. 1B, the merchant 120 may establish the merchant account 122 with the transaction service provider 130. As such, the merchant 120 may need to provide business information to the transaction service provider 130, such as business name, address, phone number, etc., and financial information, such as banking information, merchant account information, credit card information, payment processing information, etc.

In one implementation, the transaction service provider 130 may directly debit the customer account 114 and directly credit the merchant account 124 because both of the accounts 114, 124 are established with the transaction service provider 130. Optionally, in another implementation, the transaction service provider 130 may still process the transaction through the clearing house even though both of the accounts 114, 124 are established with the transaction service provider 130.

In one embodiment, the transaction device 122 is utilized by the merchant 120 to accept payment from the customer 110. The transaction device 122 comprises some form of payment device, such as a POS terminal, a cash register and/or a personal computer. The transaction device 122 may comprise one or more functional components including a reader component, an input component, a processor component, a transceiver component, and an output component. In one example, the reader and input components may comprise an RFID reader that is adapted to sense an RFID component of the RFID sticker. In other examples, the reader and input components may comprise various other types of readers, such as a check reader, credit card reader, debit card reader, keyboard for manual input of account information, or some combination thereof for the purpose of acquiring transaction information from the customer 110 at the point of sale. Once acquired, the transaction information may be transferred from the transaction device 122 of the merchant 120 to the processing component 132 of the transaction service provider 130 for processing.

In one implementation, the transaction may take place over a network, such as the Internet. The payment media 112 of the customer 110 may include an interface device, such as a computer, that is adapted to allow the customer 110 to communicate with the merchant 120 and the transaction service provider 130 via the network. The transaction device 122 of the merchant 120 may include a server that is adapted to communicate with the customer 110 to allow viewing and purchase of items via the network and further communicate with the transaction service provider 130 to process financial transactions via the network. Similarly, the processing component 132 of the transaction service provider 130 may include a server that is adapted to communicate with the customer 110, the merchant 120 and the clearing house 140 to process and resolve financial transactions via the network.

In one embodiment, the network may be implemented as a single network or a combination of multiple networks. For example, in various embodiments, the network may include the Internet, one or more intranets, landline networks, wireless networks, and/or some other appropriate type of communication network. In another example, the network may comprise a wireless telecommunications network (e.g., cellular phone network) adapted to communicate with other communication networks, such as the Internet.

In one embodiment, the customer 110 may use an interface device, such as a personal computer or cell phone device, to communicate with the merchant and/or access the customer account 114 via any appropriate combination of hardware and/or software configured for wired and/or wireless communication over the network. The customer 110 may use a browser application to browse information available over the network. For example, the customer may use a web browser to view information available over the Internet.

In one embodiment, the customer 110 may be asked to provide identification information to the merchant 120 for transaction processing. For example, the identification information provided by the customer 110 may include personal information (e.g., a user name, password, photograph image, biometric id, address, phone number, etc.) and banking information (e.g., banking institution, credit card issuer, user account numbers, security information, etc.). In various implementations, identification information provided by the customer 110 may be passed with a purchase request to the processing component 132 of the transaction service provider 130 to associate the customer 110 with the customer account 114 maintained by the transaction service provider 130.

In one embodiment, the merchant 120 may maintain one or more merchant servers on the network for offering various items for purchase in exchange for payment to be received from the customer 110 over the network. In this regard, each of the one or more merchant servers may include a database for identifying available items, which may be made available to the customer 110 for viewing and purchase. Each of the merchant servers may include some form of a marketplace application configured to provide information over the network to the browser application used by the customer 110. For example, the customer 110 may interact with the marketplace application through the browser application over the network to search and view various items for purchase identified in the database. Each of the one or more merchant servers may include some form of checkout application configured to facilitate online purchase transactions by the customer 110 for items identified by the marketplace application. In this regard, the checkout application may be configured to accept payment information from the customer 110 over the network.

In one embodiment, the merchant 120 may need to provide identification information to be included as part of the transaction request. The identification information may include business and banking information. In various implementations, the identification information provided by the merchant 120 may be passed with the transaction request to the processing component 132 of the transaction service provider 130 to process the transaction, and the identification information provided by the merchant 120 may be used by the processing component 132 to associate the transaction with the merchant account 124.

In one embodiment, the transaction service provider 130 provides transaction processing for point of sale or online purchases on behalf of the customer 110 and the merchant 120. In this regard, the transaction service provider 130 may use some form of payment application configured to interact with the customer 110 and the merchant 120 to facilitate the purchase of items. In one example, the transaction service provider 130 may be provided by PayPal, Inc. of San Jose, Calif., USA.

In one embodiment, the transaction service provider 130 may be configured to maintain a plurality of customer and merchant accounts 114, 124, each of which may include account information associated with customers and merchants. For example, account information may include private financial information of the customer 110 and merchant 120, such as one or more account numbers, passwords, credit card information, banking information, or other types of financial information, which may be used to facilitate transactions between the customer 110 and the merchant 120. In various implementations, the transaction service provider 130 may be configured to fund the customer account 114 from an account at a banking institution and/or a credit issuer with permission from the customer 110. As such, the payment media 112 is linked to the customer account 114 of the transaction service provider 130, and the transaction service provider 130 funds the customer account 114 with funds from another account, such as a checking account with a bank and/or a credit account with a credit issuer, as provided by the customer 110. The merchant account 124 may be funded in a similar manner.

Figure 1C:
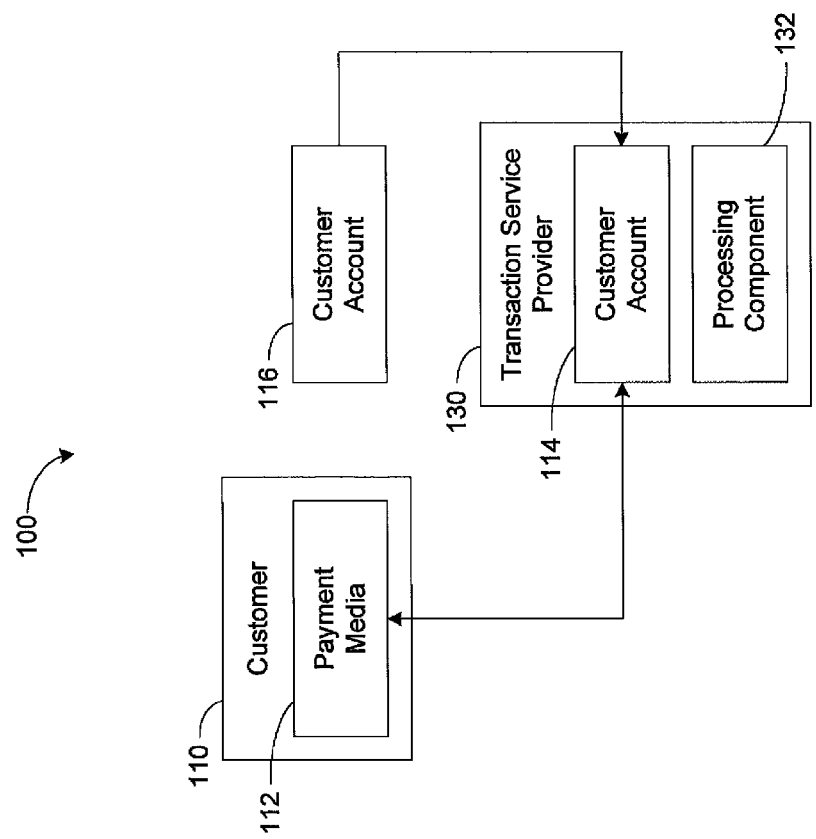

In one embodiment, referring to FIG. 1C, the transaction service provider 130 is adapted to communicate with the customer via a communication network, such as the Internet, a telephone network and/or mail. As such, the transaction service provider 130 is able to receive a request for one or more RFID stickers from the customer 110 via, for example, the Internet, generate the one or more RFID stickers liked to the customer account 114, and distribute the one or more generated RFID stickers to the customer 110 via, for example, the mail. Further scope and functionality of the distribution of the payment media 112 (e.g., RFID stickers) is described in greater detail herein.

In one implementation, the customer 110 may have a plurality of customers accounts 114, 116 linked together in some way. As such, the customer 110 may transfer money between a first and second customer account 114, 116 to maintain a balance in either customer account 114, 116. It should be appreciated that the customer 110 may establish the second customer account 116 with any type of financial institution, such as a bank, or the customer may establish the second customer account 116 with the transaction service provider 130. Further, the payment media 112 may be linked to a single customer account, such as the first customer account 114, or to both customer accounts 114, 116, without departing from the scope of the present disclosure. For example, as previously described, the payment media 112 may be linked to the customer account 114 of the transaction service provider 130, and the transaction service provider 130 may be given permission by the customer 110 to fund the customer account 114 with monetary funds from another account, such as a checking account with a bank and/or a credit account with a credit issuer.

Embodiments of the present disclosure provide an efficient and convenient generation and distribution mechanism for the RFID chip. In one implementation, the user may obtain a plurality of RFID stickers to put in multiple locations, (e.g., physical cards, cell phones and wallets.), wherein each of the RFID stickers may be linked to a single user account of a plurality of different user accounts. In another implementation, the user may cancel and/or replace RFID stickers when lost at no cost, without closing their user account. As described in greater detail herein, the customer 110 may customize one or more payment parameters for the RFID chips before activation and/or after activation.

Figure 2:
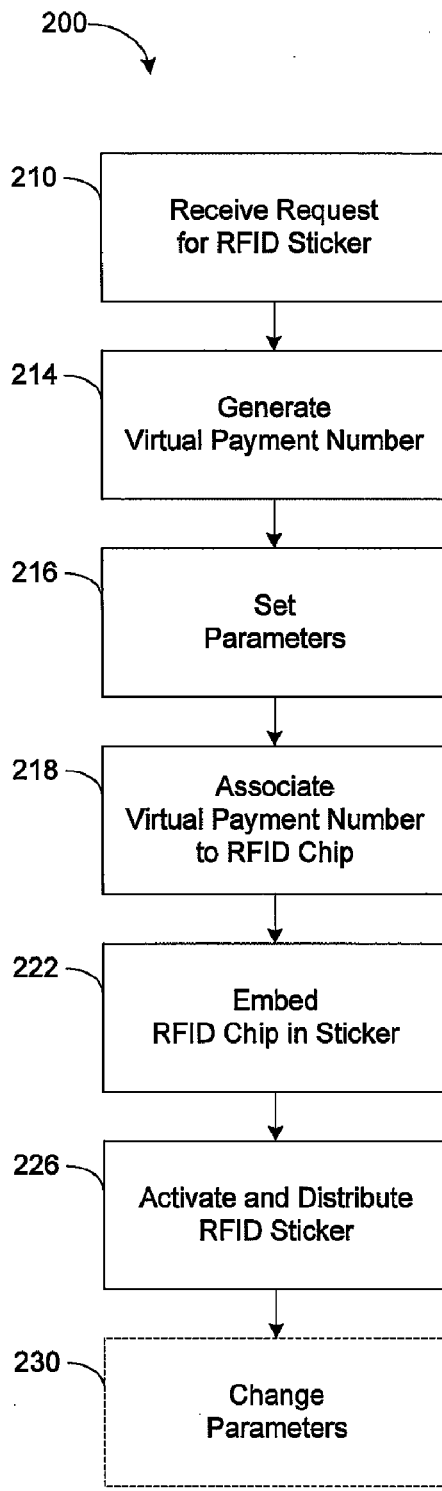
FIG. 2 shows a block diagram of a method for distribution of payment media in accordance with an embodiment of the present disclosure.

FIG. 2 shows one embodiment of a method 200 for distributing payment media 112, such as one or more RFID stickers, to the user or customer 110. For purposes of explanation, the method 200 is discussed in reference to FIGS. 1A-1C, but should not be limited thereto.

In one implementation, the transaction service provider 130 receives a request for at least one RFID sticker from the user or customer 110 (block 210). In some instances, the transaction service provider 130 may ask the user 110 to establish a customer account 114 and deposit monetary funds in the established customer account 114. In other instances, if the user 100 already has an established customer account 114, the transaction service provider 130 may require the user 110 to log into a payment processing server associated therewith via a network, such as the Internet, and request the at least one RFID sticker 112.

Next, the transaction service provider 130 generates a virtual payment number and associates it with the user or customer 110 (block 214). In one implementation, the virtual payment number is associated with at least one customer account 114 of the user 110. The user 110 may elect to fund the customer account 114 with monetary funds from another institution, such as a bank or credit issuer, wherein the transaction service provider 130 may associate the virtual payment number with another type of account and number, such as a checking or credit account number, as provided by the customer 110.

Next, the transaction service provider 130 sets one or more payment parameters for the virtual payment number based on information passed with the request (block 216). The user 110 may request and/or customize one or more particular payment parameters for the virtual payment number, such as number of uses, spending limits, authorized users, and authorized merchants. The user 110 may also change these payments parameters for the virtual payment number at any time before and after activation of the RFID sticker.

Next, the virtual payment number is associated with an RFID chip (block 218), and the transaction service provider 130 embeds the RFID chip in a sticker to form an RFID sticker as the payment media 112 (block 222). In various implementations, upon request of the user 110, a plurality of RFID chips may be embedded in a plurality of stickers, respectively, to form a plurality of RFID stickers with each RFID sticker associated with the user's customer account 114.

Next, the transaction service provider 130 activates and distributes the at least one RFID sticker (i.e., payment media 112) to the user 110 (block 226). In one implementation, distribution may include mailing the at least one generated and activated RFID sticker to the user 110. Optionally, one or more of the payment parameters for the virtual payment number may be changed or customized by the user 110 (block 230). As previously described, the user 110 may request particular payment parameters for the virtual payment number, and these payment parameters may be changed at any time after activation and distribution of the RFID sticker. For example, if the RFID sticker was stolen, then the user 110 may elect to cancel the stolen RFID sticker. In various implementations, the payment parameters of the virtual payment numbers may be activated and deactivated at will by the user 110 via, for example, a phone call including a cell phone call or accessing the customer's account 114 with the transaction service provider 130 via a communications network, such as the Internet.

Figure 3:
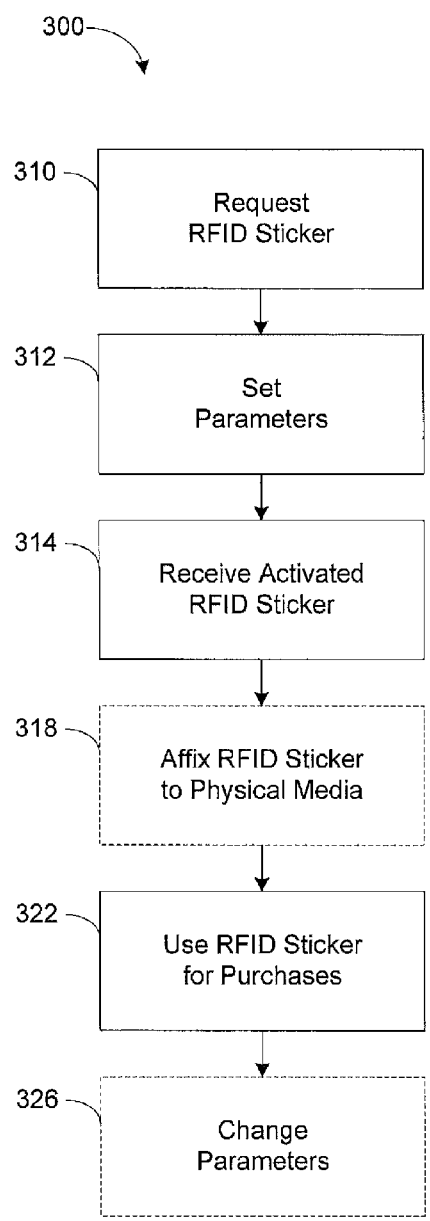
FIG. 3 shows a block diagram of a method for requesting and using payment media in accordance with an embodiment of the present disclosure.

FIG. 3 shows one embodiment of a method 300 for using the generated payment media 112, such as the at least one generated RFID sticker, to make purchases. For purposes of explanation, the method 300 is discussed in reference to FIGS. 1A-1C and FIG. 2, but should not be limited thereto.

In one implementation, the user or customer 110 logs into a payment processing server associated the transaction service provider 130 via a network, such as the Internet, and requests at least one RFID sticker as the payment media 112 (block 310). In some instances, the user 110 may be required to establish a customer account 114 with the transaction service provider 130 and deposit monetary funds in the established customer account 114 prior to requesting the at least one RFID sticker. In other instances, if the user 100 already has an established customer account 114, the user 110 may directly log into transaction service provider 130 via the network and directly request the at least one RFID sticker. In various implementations, the user 100 sets or customizes one or more payment parameters for the virtual payment number (block 312). For example, the user 110 may set one or more payment parameters including number of uses, spending limits, authorized users, and authorized merchants. The user 110 may also change these payments parameters for the virtual payment number at any time before and after activation of the RFID sticker.

Next, the user 110 receives the at least one RFID sticker from the transaction service provider 130 via a distribution medium, such as the mail (block 314). Next, the user 110 may optionally affix the at least one received RFID sticker to a physical media (block 318), such as a plastic card or cell phone. In various implementations, if the user 110 receives a plurality of different RFID stickers, each RFID sticker may be placed separately on a different physical media, such as a plastic card, a cell phone, a wallet, a laptop, or a PDA (i.e., personal digital assistant).

Next, the user 110 may then purchase items from the merchant 120 at a transaction device 122, such as a POS device, and wave the RFID sticker adjacent to the POS device for purchases (block 322). As such, the payment for the purchased items is charged to the virtual payment number associated with the RFID sticker, and then monetary funds are debited from the user's customer account 114 and credited to the merchant's account 124.

Optionally, the user 110 may change one or more of the payment parameters for the virtual payment number after receiving and/or using the RFID stickers (block 326). As previously described, the user 110 may change or customize one or more of the payment parameters for the virtual payment number. The payment parameters of the virtual payment numbers may be activated and deactivated at will by the user 110 with a phone call or accessing the transaction service provider 130 via the Internet.

Figure 4A:
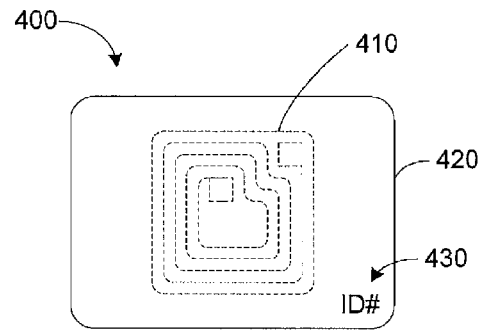
FIG. 4A shows a block diagram of an RFID sticker, as payment media, in accordance with an embodiment of the present disclosure.

FIG. 4A shows a block diagram of one embodiment of an RFID sticker 400 having an RFID chip 410 embedded in a sticker 420. In general, Radio Frequency Identification, or RFID, is a technology for identification purposes. RFID systems use transponder IC chips, referred to as tags, that store and transmit identifying information to an RFID reader that is adapted to interface with a computer. As described herein and as shown in FIG. 4A, the RFID chip 410 is embedded in the sticker 420 for the purpose of identification using radio waves transmitted from the transponder IC chip and received by an RFID reader. Some RFID chips include an IC component for storing and processing information and an antenna for receiving and transmitting radio wave signals. As such, in one implementation, information related to the user 110 and the user's customer account 114 may be stored on the RFID chip 410 and embedded in the sticker 420 and transmitted to an RFID reader, such as the POS transaction device 122 of the merchant 120.

In various embodiments, the sticker 420 may comprise various sizes suitable for various applications. For example, the sticker 420 may be sized proportionally to be placed on a plastic card having dimensions of a common debit or credit card. In another example, the sticker 420 may be sized proportionally to be placed on a cell phone having dimensions of a common cell phone. Thus, in some embodiments, the sticker 420 may be sized to less than 2 inches square depending on a particular application.

In various embodiments, the sticker 420 may include an identification symbol 430 attached thereto via, for example, printing or adhesion that may be used to track and identify the RFID sticker 400 and RFID chip 410. In various implementations, the identification symbol 430 may comprise alphanumeric characters, graphics, a barcode, and/or an email address of the user or customer 110. It should be appreciated that various other generally known identification symbols, characters graphics and/or materials may be utilized for the identification symbol 430 without departing form the scope of the present disclosure.

In various embodiments, the embedded RFID chip 410 may be delivered to the customer 110 in an activated state or a deactivated state. In the activated state, the customer 110 may receive the RFID sticker 400 with the embedded RFID chip 410 in a pre-activated state, wherein the transaction service provider 130 sets (e.g., programs) the parameters of the RFID chip 410 according to the customer's 110 desired settings (i.e., as ordered by the customer 110) prior to delivery to the customer 110. In the deactivated state, the customer 110 may receive the RFID sticker 400 with the embedded RFID chip 410 in a deactivated state, wherein the transaction service provider 130 does not pre-set (e.g., pre-program) the parameters of the RFID chip 410 prior to delivery to the customer 110. As such, in one implementation, the customer 110 is allowed to set (e.g., program) the parameters of the RFID chip 410 according to the customer's 110 desired settings prior to use. For example, the customer 110 may use a computing device, such as a personal computer (PC), and an activation application (e.g., software application) supplied by the transaction service provider 130 to activate the embedded RFID chip 420 in the delivered RFID sticker 400.

Figure 4B:
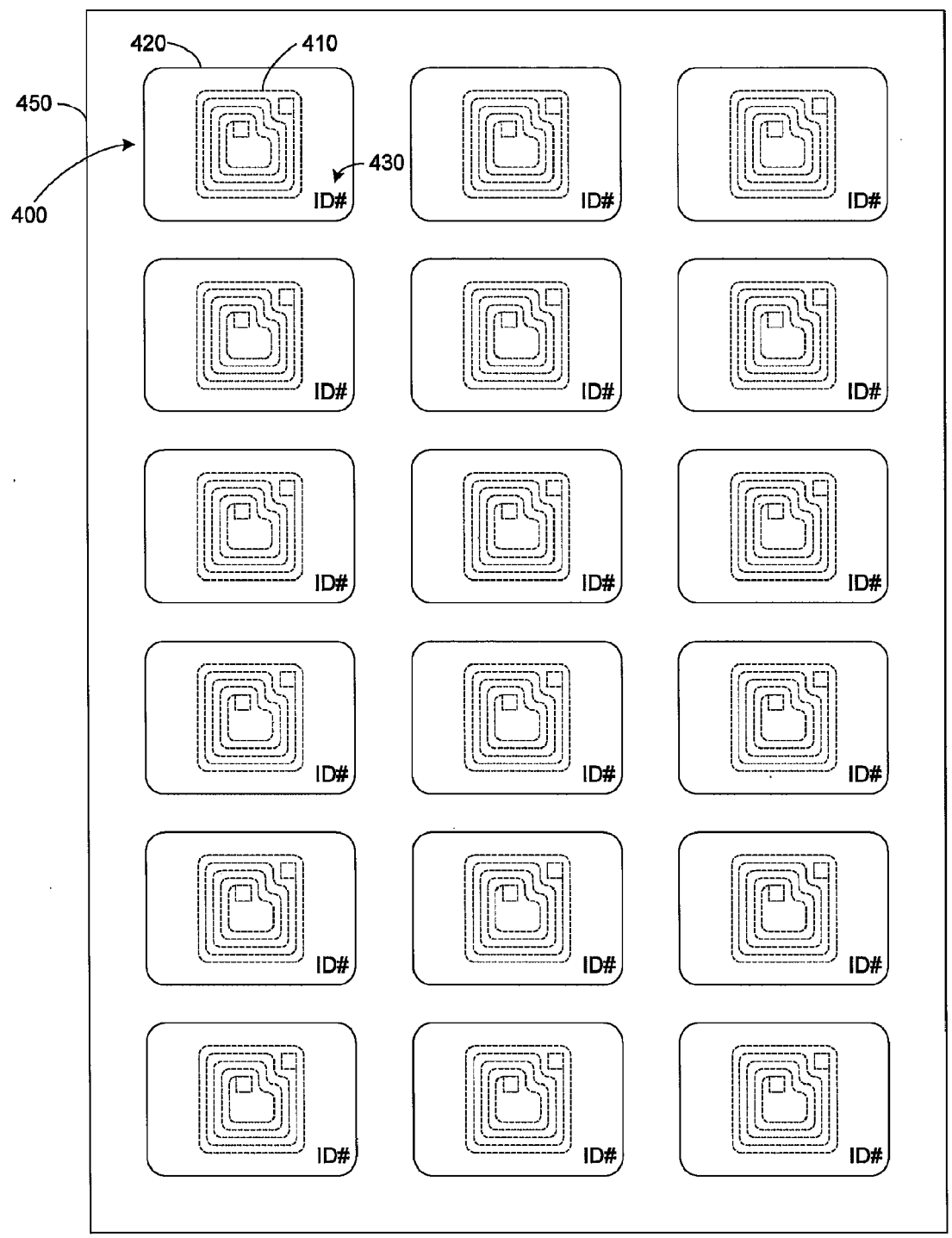
FIG. 4B shows a block diagram of a plurality of RFID stickers on a transport sheet in accordance with an embodiment of the present disclosure.

FIG. 4B shows a block diagram of a plurality of RFID stickers 400 on a transport sheet 450 in accordance with an embodiment of the present disclosure. The transport sheet 450, in one embodiment, may comprise a sheet of material adapted to temporarily receive the plurality of RFID stickers 400 so as to allow the RFID stickers 400 to be removed therefrom by the customer 110 for use. As shown in FIG. 4B, each of the RFID stickers 400 may include at least one identification symbol 430 for identification purposes.

In one implementation, the plurality of RFID stickers 400 on the transport sheet 450 are delivered to the customer in the deactivated state so that the customer 110 may separately activate each RFID sticker according to the customer's 110 desired parameters. In various examples, the customer 110 may turn the embedded RFID chip on or off, set a spending limit, and designate merchants and stores where the RFID sticker 400 may be used to make purchases and/or request services. The RFID sticker 400 provides increased convenience and flexibility to the customer 110 without the transaction service provider 130 having to issue conventional plastic cards to the customer 110.

Figure 5:
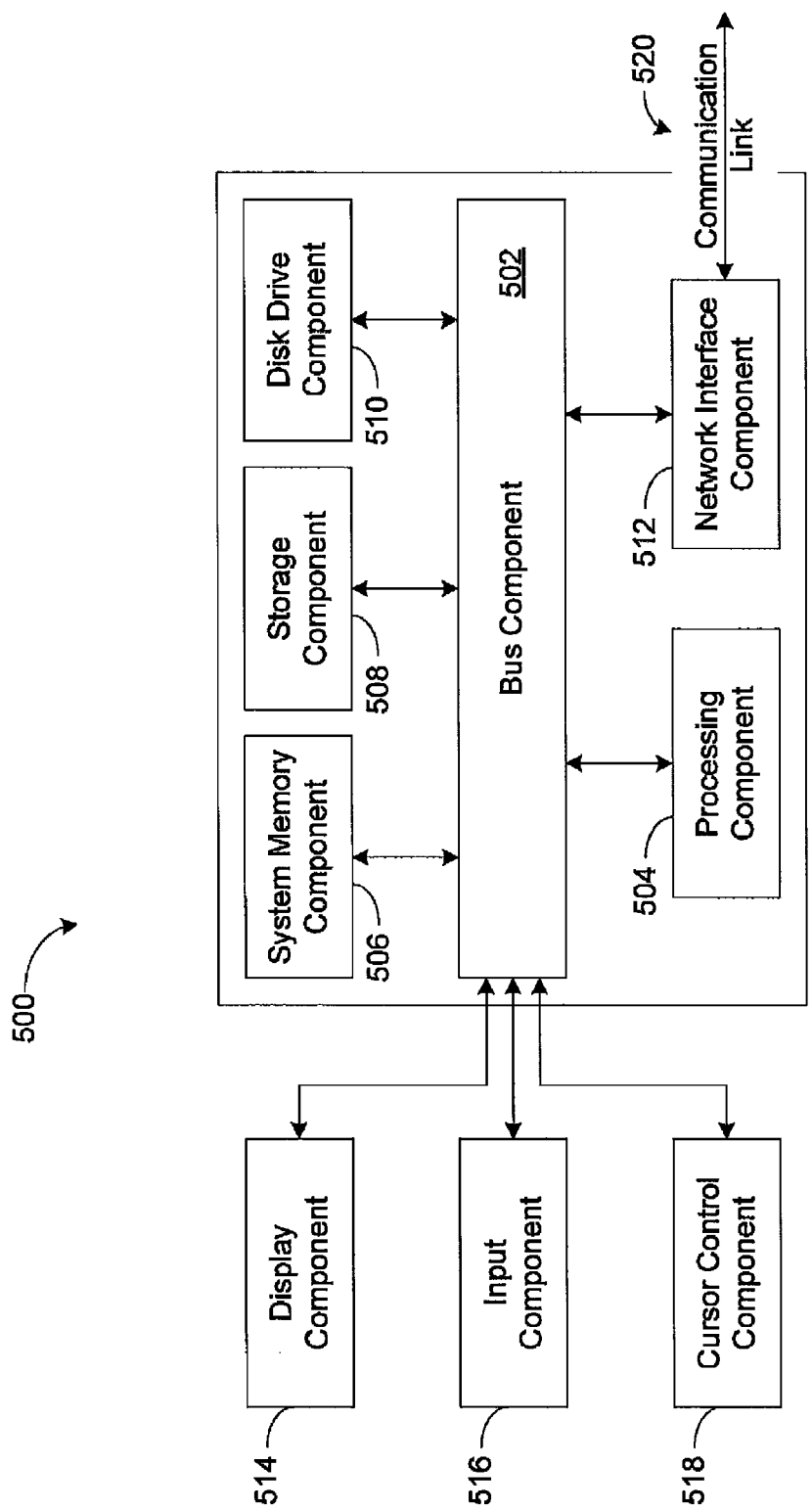
FIG. 5 shows a block diagram of a computer system suitable for implementing embodiments of the present disclosure.

FIG. 5 shows a block diagram of a computer system 500 suitable for implementing embodiments of the present disclosure. Computer system 500 includes a bus 502 or other communication mechanism for communicating information, which interconnects subsystems and components, such as processing component 504 (e.g., processor, micro-processor, micro-controller, digital signal processing (DSP) device), system memory component 506 (e.g., RAM), static storage component 508 (e.g., ROM), disk drive component 510 (e.g., magnetic or optical), network interface component 512 (e.g., modem, Ethernet card, wireless transceiver), display component 514 (e.g., CRT or LCD), input component 516 (e.g., RFID reader, keyboard), and cursor control component 518 (e.g., mouse, trackball).

In accordance with embodiments of the present disclosure, computer system 500 performs specific operations by processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of or in combination with software instructions to implement the present disclosure. In one implementation, input component 516 comprises an RFID reader having a transponder for receiving radio waves from the RFID sticker 112, 400.

Logic may be encoded in a computer readable medium, which may refer to any medium that participates in providing instructions to processor 504 for execution. Such a medium may take many forms, including but not limited to, non-volatile media, volatile media, and transmission media. In various implementations, non-volatile media includes optical or magnetic disks, such as disk drive component 510, volatile media includes dynamic memory, such as system memory component 506, and transmission media includes coaxial cables, copper wire, and fiber optics, including wires that comprise bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 520 (e.g., LAN, wireless LAN, wireless network) may perform instruction sequences to practice the present disclosure in coordination with one another.

Computer system 500 may transmit and receive messages, data, information and instructions, including one or more programs (i.e., application code) through communication link 520 and network interface component 512. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for distributing payment media to a customer, the method comprising:
  at a server of a transaction service provider, receiving a request for generation, activation, and distribution of payment media from a user via a network;
  in a processor coupled to the server, generating a virtual payment number and associating the virtual payment number to a user account related to the user and maintained at the transaction service provider;
  in the processor, setting one or more user defined payment parameters for the virtual payment number based on user information passed with the request for payment media from the user, the payment parameters including one or more of permitted number of uses, spending limits, and authorized users of the payment media, and authorized merchants at which the payment media can be used;
  in the processor, associating the virtual payment number to a radio frequency identification (RFID) chip embedded in a sticker as the requested payment media;
  activating the RFID chip; and,
  distributing the sticker having the embedded RFID chip to the user,
  wherein the user defined payment can be changed by the user at any time before or after activation of the RFID chip.

2. The method of claim 1, further comprising establishing the user account with the user for depositing funds.

3. The method of claim 1, wherein the user account is funded from at least one of a banking account and a credit account, and wherein the virtual payment number is associated with funds from at least one of the banking account and the credit account.

4. The method of claim 1, wherein the sticker is distributed to the user via mail.

5. The method of claim 1, wherein the RFID chip stores and transmits information related to the user.

6. The method of claim 1, wherein the sticker is adapted for affixing to a physical media including a plastic card or a cell phone.

7. The method of claim 1, wherein the sticker is used to facilitate financial transactions between the user and at least one merchant.

8. The method of claim 1, further comprising maintaining a plurality of accounts including a user account associated with the user and a merchant account associated with a merchant, wherein the user account includes financial information related to the user, and wherein the merchant account includes financial information related to the merchant.

9. A system for distributing payment media to a customer, the system comprising:
- at a server of a transaction service provider, means for receiving a request for generation, activation, and distribution of payment media from a user via a network;
- in a processor coupled to the server, means for generating a virtual payment number and associating the virtual payment number to a user account related to the user and maintained at the transaction service provider;
- in the processor, means for setting one or more user defined payment parameters for the virtual payment number based on user information passed with the request for payment media from the user, the payment parameters including one or more of permitted number of uses, spending limits, and authorized users of the payment media, and authorized merchants at which the payment media can be used;
- in the processor, means for associating the virtual payment number to a radio frequency identification (RFID) chip embedded in a sticker as the requested payment media;
- means for activating the RFID chip; and,
- means for distributing the sticker having the embedded RFID chip to the user,
- wherein the user defined payment parameters can be changed by the user at any time before or after activation of the RFID chip.

10. The system of claim 9, further comprising means for establishing the user account with the user for depositing funds.

11. The system of claim 9, wherein the user account is funded from at least one of a banking account and a credit account, and wherein the virtual payment number is associated with funds from at least one of the banking account and the credit account.

12. The system of claim 9, wherein the sticker is distributed to the user via mail.

13. The system of claim 9, wherein the RFID chip stores and transmits information related to the user.

14. The system of claim 9, wherein the sticker is adapted for affixing to a physical media including a plastic card or a cell phone.

15. The system of claim 9, wherein the sticker is used to facilitate financial transactions between the user and at least one merchant.

16. The system of claim 9, further comprising means for maintaining a plurality of accounts including a user account associated with the user and a merchant account associated with a merchant, wherein the user account includes financial information related to the user, and wherein the merchant account includes financial information related to the merchant.

17. A system for distributing payment media to a customer, the system comprising:
- a first component of a transaction service provider adapted to communicate with the customer via a network; and,
- a second component of the transaction service provider adapted to receive a request for generation, activation, and distribution of payment media from the customer via the network, generate a payment number and associate the payment number to a customer account related to the customer and maintained at the transaction service provider, set customer defined payment parameters for the payment number based on customer information passed with the request for payment media from the customer, the payment parameters including one or more of permitted number of uses, spending limits, and authorized users of the payment media, and authorized merchants at which the payment media can be used, associate the payment number to a radio frequency identification (RFID) chip, couple the RFID chip to a sticker as the requested payment media, activate the RFID chip, and distribute the sticker having the coupled RFID chip to the customer,
- wherein the user defined payment parameters can be changed by the user at any time before or after activation of the RFID chip.

18. The system of claim 17, wherein the second component establishes the customer account with the customer for depositing funds.

19. The system of claim 17, wherein the customer account is funded from at least one of a banking account and a credit account, and wherein the payment number is associated with funds from at least one of the banking account and the credit account.

20. The system of claim 17, wherein the sticker is distributed to the customer via mail.

21. The system of claim 17, wherein the RFID chip stores and transmits information related to the customer.

22. The system of claim 17, wherein the sticker is adapted for affixing to a physical media including a plastic card or a cell phone.

* * * * *